(12) United States Patent
Larsson et al.

(10) Patent No.: US 8,144,439 B2
(45) Date of Patent: Mar. 27, 2012

(54) METHOD AND CIRCUIT FOR PRODUCING ROTOR POSITION SIGNALS AND FOR THE COMMUTATION OF BRUSHLESS DIRECT-CURRENT MOTORS, WITHOUT USING SENSORS

(75) Inventors: Lars Larsson, Hamburg (DE); Bernhard Dwersteg, Hamburg (DE)

(73) Assignee: Trinamic Motion Control GmbH & Co. KG, Hamburg (DE)

( * ) Notice: Subject to any disclaimer, the term of this patent is extended or adjusted under 35 U.S.C. 154(b) by 206 days.

(21) Appl. No.: 12/742,475

(22) PCT Filed: Nov. 30, 2008

(86) PCT No.: PCT/EP2008/010150
§ 371 (c)(1),
(2), (4) Date: May 12, 2010

(87) PCT Pub. No.: WO2009/068314
PCT Pub. Date: Jun. 4, 2009

(65) Prior Publication Data
US 2010/0270960 A1    Oct. 28, 2010

(30) Foreign Application Priority Data

Nov. 30, 2007 (DE) .......................... 10 2007 058 057
Feb. 25, 2008 (DE) .......................... 10 2008 010 845

(51) Int. Cl.
*H02H 7/09* (2006.01)

(52) U.S. Cl. ............................................. 361/23; 361/33
(58) Field of Classification Search ................... 361/23, 361/33; 318/400.21, 400.34, 400.35
See application file for complete search history.

(56) References Cited

U.S. PATENT DOCUMENTS

| 5,751,128 A | 5/1998 | Chalupa et al. |
| 2003/0062860 A1* | 4/2003 | Wu et al. ........................ 318/254 |
| 2007/0176567 A1* | 8/2007 | Maeda .......................... 318/254 |

FOREIGN PATENT DOCUMENTS

| EP | 0663718 A | 7/1995 |
| JP | 07023587 A | 1/1995 |

OTHER PUBLICATIONS

International Search Report for corresponding International Application PCT/EP2008/010150.

* cited by examiner

*Primary Examiner* — Danny Nguyen
(74) *Attorney, Agent, or Firm* — WRB-IP LLP

(57) ABSTRACT

A method and a circuit are provided for the commutation of brushless direct-current motors (BLDC motors), without using sensors, and especially to a method and a circuit for producing rotor position signals, without using sensors, for the commutation of brushless direct-current motors. In the method and the circuit Hall sensor signals are emulated without sensors and rotor position signals free of disturbing pulses and with a correct phase position are generated from said signals. The rotor position signals can be used to carry out a reliable, sensor-free commutation.

13 Claims, 3 Drawing Sheets

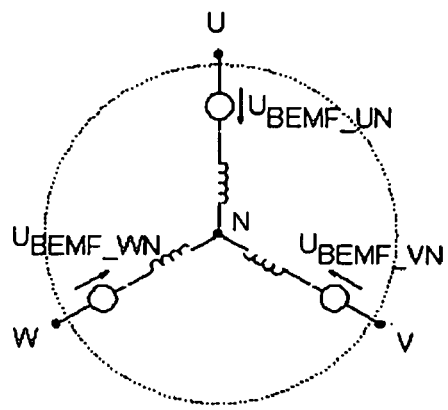
FIG. 1A
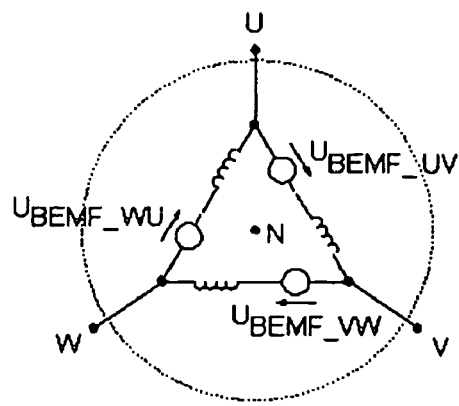
FIG. 1B
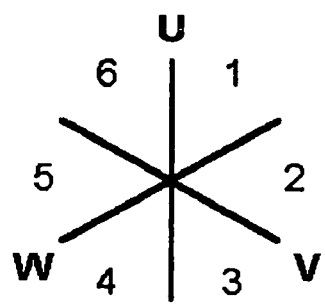
FIG. 2
|   | 1 | 2 | 3 | 4 | 5 | 6 |
|---|---|---|---|---|---|---|
| U | 0 | Z | 1 | 1 | Z | 0 |
| V | 1 | 1 | Z | 0 | 0 | Z |
| W | Z | 0 | 0 | Z | 1 | 1 |
FIG. 3

METHOD AND CIRCUIT FOR PRODUCING ROTOR POSITION SIGNALS AND FOR THE COMMUTATION OF BRUSHLESS DIRECT-CURRENT MOTORS, WITHOUT USING SENSORS

BACKGROUND AND SUMMARY

The invention relates to a method and a circuit for the commutation of brushless direct-current motors (BLDC motors), without using sensors, and especially to a method and a circuit for producing rotor position signals, without using sensors, for the commutation of brushless DC motors.

Whereas in brushed DC motors, magnet coils are disposed in the rotor and at least one permanent magnet is disposed in the stator, the brushless direct-current motor is distinguished primarily in that the magnet coils lie in the stator and the rotor is provided with one or more permanent magnets. In this arrangement, no abrading contacts to the power supply or commutation of magnet coils is necessary, so as to preclude disadvantages connected with that, in particular the known brush sparking, which can cause significant high-frequency disturbances (EMI [electromagnetic interference]), as well as wear on the brushes and collectors.

Brushless direct-current motors have, therefore, a significantly higher reliability and service life, as well as greater efficiency and diminished running noise. Moreover, they cause no soiling due to abrasion or burn by the contact brushes. These motors are realizable as both internal-rotor and external-rotor motors, whereby internal-rotor motors especially have the additional advantage of better heat dissipation from the magnetic coils in comparison to brushed DC motors.

Brushless direct-current motors (BLDC motors) are realized as endurance runners in the most diverse performance ranges.

To operate a BLDC motor, the magnetic coils must be controlled on a delayed basis with currents of predetermined direction, so that the magnetic field built in the stator turns and entrains the rotor. Toward this end, i.e., in order to achieve a chronologically correct commutation of the coil currents, information is needed regarding the current place or position of the rotor relative to the magnetic coils.

A difference needs to be made here between recording the rotor position with and without sensors and the corresponding commutation of the coil currents or motor control, which is carried out by it.

A sensor-supported recording of the rotor position can, for example, take place by means of magnetic sensors (for example, Hall effect sensors, field plates), electrical sensors (potentiometers, for example) or optical sensors (for example, encoders or resolvers), while during a detection without sensors, the mutually-induced voltage (back EMF) of the rotor in an uncontrolled magnet coil is captured and analyzed.

Both ways of determining rotor position include disadvantages.

While in sensor-supported capture, the above-named sensors can be seen as disadvantageous on the basis of their additional costs as well as the amount of space needed, in detection without sensors, the problem often arises that the mutually-induced voltage captured is overlaid with inductive disturbing pulses, if a current is still flowing through the coils up to the time of the electrical separation of the coils in question. The extent of these disturbing pulses basically depends on the mechanical load on the motor shaft. Because these disturbing pulses can reach very great amplitudes and a not insignificant duration, they are not disposed of adequately with analog filtering by and large, so that they are also overlaid to the reconstructed position or commutation signals and don't provide a reliable commutation of the coils under all motor conditions.

In motors with coils connected in a star circuit as in FIG. 1A, there is furthermore the problem that the star point N needed to measure the voltage induced by the rotor in one of the coils is not usually taken-out of the motor separately, so that it must be reconstructed electrically.

Even though there are several advantages to this, such a reconstruction in general, it is relatively costly or relatively inexact, especially if the motor is to be operated under very different load conditions.

It is desirable to provide a cost-efficient, space-saving and reliable option, with which brushless direct-current motors can be electrically commutated.

It is also desirable to specify a process and a circuit for the production of rotor position signals for the commutation of brushless direct-current motors without using sensors, with which a simple, reliable, and in particular disturbance-free commutation is possible, even under unfavorable load conditions.

According to an aspect of the present invention, a process is provided for the production of rotor position signals for the commutation of brushless direct-current motors without using sensors via the following steps:

production of emulated (i.e., reproduced) Hall sensor signals through differentiation of the voltages adjoining the motor's coil terminals which are not supplied with current, which voltages are mutually-induced by a rotor of the motor in the coils; and production of rotor position signals by stopping the emulated Hall sensor signals for a period after the appearance of an edge change of these signals, which minimally corresponds to the time period or the interval of the disturbing pulses from this edge change which overlay the emulated Hall sensor signals.

According to another aspect of the present invention, a circuit is provided for production of rotor position signals without using sensors to commutate brushless direct-current motors, which has a first device for production of emulated Hall sensor signals, by differentiating voltages adjoining coil terminals of the direct-current motor, which are not supplied with current, which are mutually-induced by a rotor in the coils, as well as a second device for suppression of disturbing pulses in the Hall sensor signals, and in particular according to a process according to one of claims 1 to 3.

A particular advantage of this solution consists in that the additional circuit complexity is relatively light and cost-effective, and for example can be realized as part of a broader integrated motor control unit.

BRIEF DESCRIPTION OF THE DRAWINGS

Other details, features and advantages of the invention result from the following description of an exemplary preferred embodiment on the basis of the drawings. That is:

FIG. 1 shows two typical coil circuits of a three-phase motor;

FIG. 2 shows a representation of six sectors as well as three phases of such a motor to illustrate the commutation;

FIG. 3 shows a commutation pattern for six sectors;

DETAILED DESCRIPTION

Figure 4:
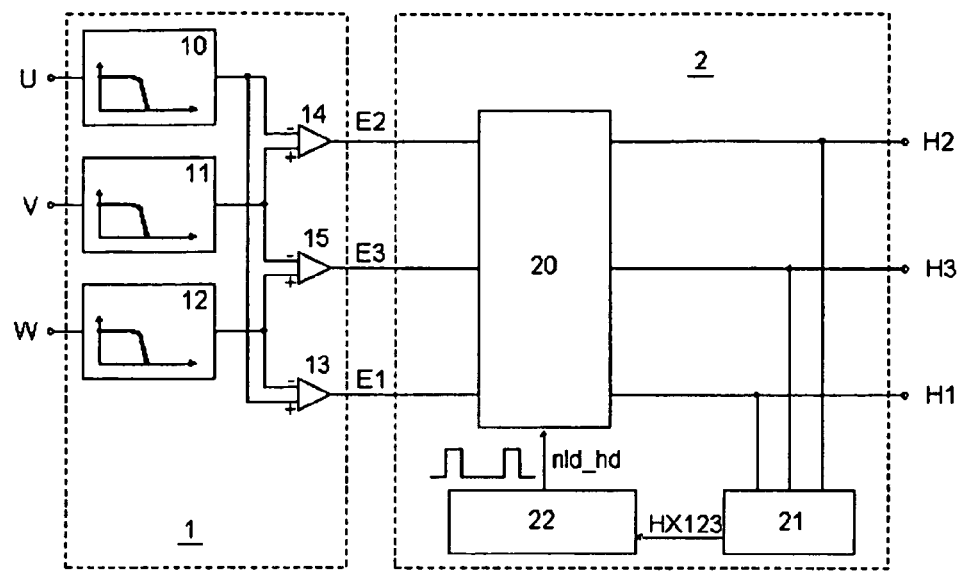
FIG. 4 shows a circuit for production of commutation signals without using sensors.

Most often brushless direct-current motors are used with three phases U, V, W, that is, three magnetic coils, whereby the coils are connected either in a star connection, as in FIG. 1A, or, as in FIG. 1B, in a delta connection. In a known commutation without using sensors, the voltages induced through the movement of the rotor in the magnetic coils of the stator are evaluated (i.e., U_BEMF_UN, U_BEMF_VN, U_BEMF_WN in BLDC motors in a star connection or U_BEMF_UV, U_BEMF_VW, U_BEMF_WU in BLDC motors in a delta connection). With commercial motors in a star connection the star point N is not taken out of the motor separately, but must be reconstructed electrically, as mentioned above, which can entail various disadvantages.

FIG. 2 shows schematically the three phases U, V, W, offset at 120° or the outer coil terminals of such a motor, whereby when capturing rotor position using a sensor, usually on each phase or motor coil there is also a Hall sensor disposed as locator (not shown).

For block commutation (i.e., one coil is always connected to a positive supply voltage, one coil is connected to ground or to a negative supply voltage, and one coil is separated from the supply voltage, or loose) the 360° electrical cycle, as shown in FIG. 2, is divided into six sectors (1, 2, 3, 4, 5, 6) of equal size, i.e., each of 60°.

Under the assumption that three Hall sensors disposed at an angle of 120° are used, these together create a bit vector, which uniquely assigns one of six sectors 1 through 6 to each rotor position. The zero vector and the one vector do not appear thereby. During vector rotation the Hall sensors deliver a one-step bit vector result. A phase pattern for the magnetic coil is assigned to each bit vector.

In other words, to commutate the coils, a magnetic field configuration is assigned to each of sectors 1 through 6, which is defined by an individual current feed to the coil, which in turn is determined by the effective [RMS] voltages adjoining terminals U, V, W of the motor. These RMS voltages are usually generated by pulse width modulation (PWM) of the supply voltage.

If, for example, a rotation of the rotors takes place in the sector order 1, 2, 3, 4, 5, 6, 1, 2, 3, 4, 5, 6, . . . each rotor position R={1, 2, 3, 4, 5, 6} is assigned the succession position ((R+1) mod 6) [mod=modulo]. If the rotor is in sector 2, the voltage pattern adjoins UVW=Z10, and it will be switched to the voltage pattern UVW=1Z0 of sector 3 (=(2+1) mod 6)), i.e., commutated. In this, "0" means that the coil terminal in question is connected to ground, "1" means that the coil terminal in question is connected to the power supply, and "Z" means that the coil terminal in question is loose. This commutation model is represented in FIG. 3 in the form of a UVW voltage schedule chart for all six sectors 1 through 6.

Instead of switching the supply voltage directly to the motor's coil terminals U, V, W, the supply voltage can have a pulse width modulation (PWM) overlaid on it, in order to be able to set a lower effective voltage than the supply voltage. By adjusting the PWM mark-to-space ratio, the rotor's rotating speed can be controlled or regulated.

When opening a coil, that is when switching from 0 to Z, or from 1 to Z on one of the terminals U, V, or W of the motor, inductive stress peaks $U=-L*dI/dt$ occur, as was mentioned above, if at the moment of the electrical separation (the change-over to open condition (Z)) a current is still flowing through the connection of the motor in question, that is, through the coil in question. The rate of the current flowing at the moment of separation depends essentially on the mechanical load on the motor shaft. The inductive stress peaks disturb the reconstructed Hall signals and cannot be suppressed by means of a simple filter, because they can have very great amplitude and a not insignificant duration.

With the process according to the invention or the circuit according to the invention, the influx of stress peaks or disturbing pulses can be suppressed or eliminated in a simple and efficient way.

For the sake of completeness, it should be mentioned that motors with Hall sensors arranged in a 60° angle are also known. For such motors the conditions are other than as depicted above (i.e., the sequence of Hall sensor signals is different). The majority of BLDC motors have Hall sensors arranged at a 120° angle. With the process or the circuit described here, rotor positions signals are created which correspond to position signals of Hall sensors arranged at a 120° angle, whereby the Hall sensors are so arranged that the zero-crossings of the mutually-induced voltages in the coils in question coincide as much as possible with the zero-crossings of the Hall sensor signals—the zero-crossings should be identical in the ideal case.

Therefore, with the process according to the invention or the circuit according to the invention, rotor position signals are created without using sensors which correspond to signals created with Hall sensors, without, however, having to accept the disadvantages associated with using Hall sensors (or other sensors) or the above-mentioned inductive disturbing signals in the case of a commutation without using sensors, and whereby a star point N (see above) does not need to be reconstructed.

FIG. 4 shows a block diagram of a circuit according to the invention. The circuit includes as components a first device 1 for the creation of emulated Hall sensor signals, as well as a second device 2 for the suppression of disturbing pulses in the emulated Hall sensor signals.

The first device 1 includes a first, a second, and a third low-pass filter 10, 11, 12, which are each connected via their input to one of three phases or the outer coil terminals U, V, W of the motor. (Before the input of the low-pass filter, voltage dividers are to be applied, if necessary, to the extent required by the common mode range of the filter.) Preferably, secondary low-pass filters are used, the filter characteristics of which are adjustable to the motor speed (for example via PWM mark-to-space ratio as mentioned above), or adaptable to the speed (for example, by means of an SCF—Switched Capacitor Filter), in order to realize the lowest possible phase error. Alternatively, for the same purpose, filters of higher or very high orders may be deployed.

Figure 5:
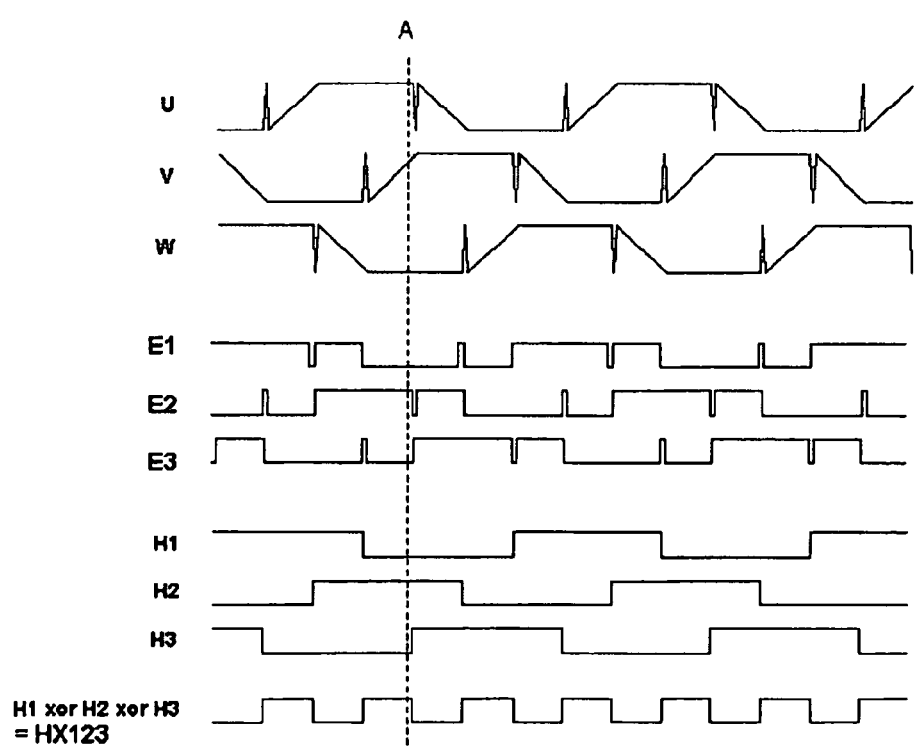
FIG. 5 shows a representation of different voltage time sequences in the circuit according to FIG. 4.

FIG. 5 shows the voltage curves adjacent to the terminals U, V, W, which are caused by the rotor turning in the coils connected to the terminals, including each disturbing pulse that arises during the transition to the open coil condition (that is, from 0 to Z or from 1 to Z). For the operation of the motor according to the invention, however, only a very low minimum rotational speed is therefore necessary.

The basis for these voltages to flow in trapezoidal and not sinusoidal form lies in the motor control with block commutation used in the example.

The first device 1 includes furthermore a first, a second, and a third digital comparator 13, 14, 15 with which differential inputs are comprised from the output signals of the three low-pass filters 10, 11, 12. Toward this end, according to FIG. 4, the output of the first low-pass filter 10 is connected to the plus-input of the first and the minus-input of the second comparator 13, 14; the output of the second low-pass filter 11 is connected to the plus-input of the second and the minus-input of the third comparator 14, 15; and the output of the third low-pass filter 12 is connected to the minus-input of the first and the plus-input of the third comparator 13, 15.

The voltage curves E1, E2 or E3 which are adjacent to the output of the first, the second and the third comparators 13, 14, 15 are likewise depicted in FIG. 5. There, E1 is the difference of the low-pass filtered voltages U–W, E2 is the difference of the low-pass filtered voltages V–U, and E3 is the difference of the low-pass filtered voltages W–V.

E1, E2 and E3 are emulated Hall sensor signals for whose creation no electrically reconstructed or virtual star point N is needed, which however still in the voltage curves U, V, W are overlaid with available disturbing pulses which are also shown in FIG. 5.

The second device serves to eliminate these disturbing pulses (disturbing pulse suppression) 2, which has a holding register 20, a XOR logic gate (i.e., an exclusive OR gate) 21 and a monoflop 22 triggered by a rising-edge and falling-edge as components.

The holding register 20 has three inputs, which are each fed output signals E1, E2, E3 from the three comparators 13, 14, 15, as well as three outputs, which are each linked with a first, a second or a third output H1, H2, H3 of the disturbing pulse suppression 2, and which are adjacent to the emulated Hall sensor signals which are freed from disturbing pulses. Their courses H1, H2, H3 also are depicted in FIG. 5 (rotor position signals).

Figure 6:
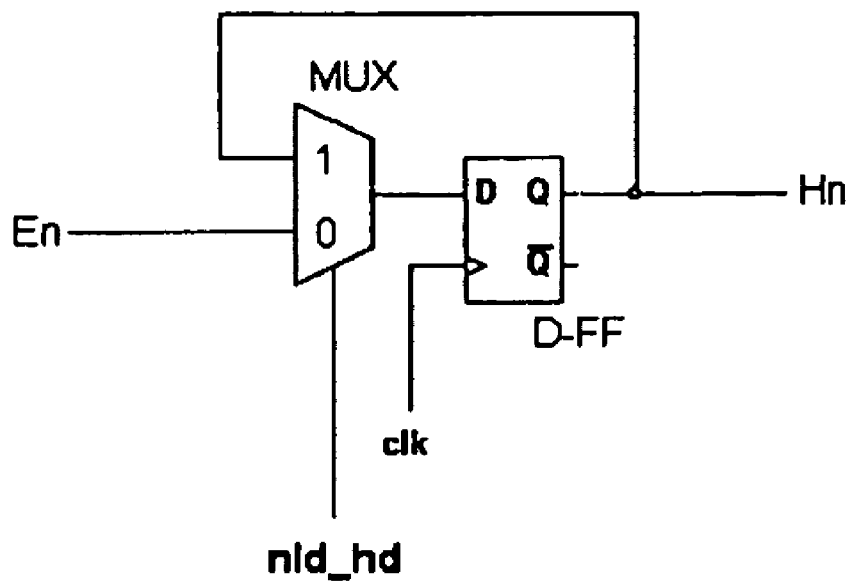
FIG. 6 shows a formwork part of the circuit according to FIG. 4.

The holding register 20 has three holding register circuits working in parallel, a schematic of which is shown in FIG. 6. Such a circuit is provided for each of the three input signals of the holding register 20 (i.e., for the output signals En of the comparators 13, 14, 15). The three holding register circuits each include a D-type flip-flop [DFF] with a multiplexer MUX. Thereby, one of the output signals En (n=1, 2, 3) of the comparators 13, 14 or 15 is adjacent to one 0-input of the multiplexer MUX, while the 1-input is connected to the output Q of the D-type flip-flop D-FF, which is also adjacent to the corresponding output Hn (n=1, 2, 3) of the holding register 20. The output of the multiplexer MUX is adjacent to the D-input of the D-type flip-flop D-FF. The multiplexer MUX of all three holding register circuits is connected by the output signal nld_hd of the monoflop 22, while a sampling clock clk is adjacent to the clock input of the D-type flip-flop D-FF of the three holding register circuits.

To control these holding register circuits, the output signals Hn of the holding register 20 are subdued first by means of the XOR logic gate 21 of an exclusive OR logic gate H1 xor H2 xor H3 (=HX123). The output signal HX123 of the XOR gate 21, the course of which is likewise depicted in FIG. 5, is fed to the monoflop 22 in order to trigger it. For the duration of the triggered condition of the monoflop 22 (and therefore of the first condition of the output signal nld_hd of the monoflop 22 fed to holding register 20), the holding register 20 stops each of the three current 1- or 0-conditions of the output signals H1 H2 or H3 adjacent to its exits, so that disturbing pulses which arise during this period of time which are superimposed on the input signals E1, E2, E3 adjacent to the input of the holding register 20, can exercise no change or influence on the output signals H1, H2, H3, and in this way are eliminated.

With the help of the reference line in FIG. 5, marked with dashes, it is possible to track in an exemplary way the temporal correlations between the momentary voltages on the coil terminals U, V, W for a specific point in time, including a disturbing pulse on coil terminal U, as well as the output signals E1, E2, E3 of the three comparators 13, 14, 15 of the output signals H1, H2, H3 of the holding register 20 and the XOR gate 21 (HX123).

Figure 7:
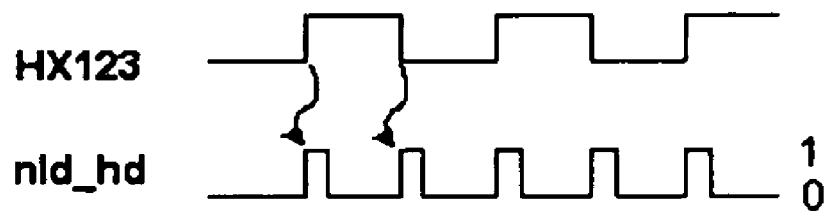
FIG. 7 shows a further representation of the voltage time sequences in the circuit according to FIG. 4.

In particular, according to FIG. 7, each edge change of the output signal HX123 of the XOR gate 21 switches the output signal (blanking signal) of the monoflop 22 to "1" (nld_hd=1) for a specific duration, and thereby switches the three holding register circuits working in parallel (FIG. 6) to "hold" for this duration (blank time), until possible disturbances or disturbing pulses are over, through the use of induction peaks which are superimposed on the input signals E1, E2 and E3.

During the holding phase (hold), the holding register 20 records the condition of its output signals H1, H2, H3 by which the commutation of the motor coils is controlled, and thereby eliminates the disturbing pulses, so that during this holding phase no undesirable commutation can be caused by disturbing pulses, which would lead to more disturbing pulses and thereby to a build-up.

During the loading phase ("load"), i.e., blanking signal nld_hd=0, with each clock pulse period (sampling clock), the inputs E1, E2, E3 of the holding register 20 are switched to their outputs H1, H2, or H3. The sampling clock is thereby identical to the clock the filter characteristics of the low-pass filter 10, 11, 12 are operated with (SCF clock).

Through suitable choice of sampling clock a simple parameterizable suppression of the inductive disturbing pulses is possible, which are created in block commutation through cutting a coil still supplied with current (switches 0-Z and 1-Z, see above).

The creation of the blanking signal nld_hd according to FIG. 7 can take place functionally with a monoflop 22, which is triggered with either edge (i.e., with the rising edge or the falling edge). Such a monoflop can be built from a customary monoflop triggered by one edge, if the clock signal is time-delayed and linked via XOR logic with the undelayed clock signal, the signal thus created being used then as clock signal for the monoflop triggered by one edge. The time-delay (and the resulting duration of the condition nld_hd=1) is determined or established by the expected duration of the disturbing pulses. With each edge change of the signal HX123, a short pulse of this duration is created, which has a rising edge and a falling edge (FIG. 7). In this way, each edge change of the signal HX123 can trigger a monoflop triggered by one edge.

With the process according to the invention or the circuit according to the invention, it is therefore possible to create rotor position signals that are free of disturbing pulses with the correct phase position, which correspond to Hall sensor signals, without the need for any frequency-dependent signal delay. There is no significant phase displacement (which in many other methods can amount to 30°), which would be costly to balance out.

The commutation without sensors according to the invention works also when the motor operates at very low rotational speeds. An exact knowledge of electrical motor parameters is not necessary for the realization of the invention (as opposed to the filtering of disturbing pulses mentioned at the beginning).

Finally, the commutation of the motor can be carried out according to the invention with the help of the commutation signals H1, H2, H3 in the same way as it is with signals created with Hall sensors, because six commutation positions are available according to the invention, as depicted in FIG. 2.

It should also be noted that with the principle according to the invention, disturbing pulses of another kind can be eliminated, those which are superimposed on the Hall sensor signals after an edge change, provided that the duration of the pulse created by the monoflop (blank time, condition nld_hd=1) is adjusted to the duration and to the temporal displacement of this disturbing pulses from the edge change.

The process according to the invention to create rotor position signals without sensors can be carried out as a part of a process to commutate brushless direct-current motors without sensors or as part of a process to control or to operate brushless direct-current motors.

Correspondingly a circuit according to the invention can be designed to create rotor position signals without sensors as a component of a circuit to commutate brushless direct-current motors without sensors or as a component of a trigger circuit to control or to operate brushless direct-current motors. Preferably such circuits are integrated on a circuit board.

These methods and circuits are preferably used for so-called small motors with power of up to 100 Watts. The typical lengths or duration of the above-described disturbing pulses evoked by the separation of the magnetic coils (and thereby the necessary halting or "freezing" of the emulated Hall sensor signals) generally lies in a range of between about 100 μs and 10 ms, while their amplitudes can reach the realm of the level of the supply voltage. For the sake of completeness, the halting or freezing can take place infinitely soon after the detection of an edge of a Hall signal or its change. The only important point is that after such a change the emulated Hall signals be stopped or frozen for the above-named duration, so that the disturbing pulses of the output signals are no longer superimposed.

The invention claimed is:

1. A method for the production of rotor position signals for the commutation of brushless direct-current motors without using sensors via the following steps:
   production of emulated Hall sensor signals through differentiation of the voltages adjoining the motor's coil terminals which are not supplied with current, which voltages are mutually-induced by a rotor in the coils; and
   production of rotor position signals by stopping the emulated Hall sensor signals for a period of time after the appearance of an edge change of these signals, which minimally corresponds to the time period or the interval of the disturbing pulses from this edge change which overlay the emulated Hall sensor signals.

2. Method according to claim 1, in which the voltages adjoining the coil terminals are subjected to a low-pass filtering before their differentiation.

3. Method according to claim 2, in which low-pass filter characteristics are adjusted depending on the speed of the motor.

4. Method for the commutation of brushless direct-current motors without using sensors, using a method in accordance with claim 1.

5. Circuit for creation of rotor position signals for the commutation of brushless direct-current motors, with a first device for production of emulated Hall sensor signals, by differentiating voltages adjoining coil terminals of the direct-current motor, which are not supplied with current, which are mutually-induced by a rotor in the coils, as well as a second device for suppression of disturbing pulses in the Hall sensor signals, in particular according to a method according to claim 1.

6. Circuit according to claim 5, in which the first device has a first, a second and a third low-pass filter, to which voltages adjoining one of the coil terminals of the direct-current motor are fed for low-pass filtering.

7. Circuit according to claim 5, in which the first device has a first, a second and a third unit, with which differences between two of the voltages adjoining the coil terminals of the direct-current motor can be generated.

8. Circuit according to claim 7, in which the first, second and third unit is formed with a first, second or a third digital comparator for differentiation of voltages.

9. Circuit according to claim 5, in which the second device has a holding register which is fed the emulated Hall sensor signals, an XOR logic gate unit for signals adjoining the output of the holding register, as well as a monoflop triggered by a rising-edge and falling-edge, which is fed the output signals of the unit, to switch the holding register in such a way that it holds the signals adjoining its output for a certain period of time after an edge change of the signal.

10. Circuit according to claim 9, in which the monoflop is so proportioned that the period of time corresponds at least to the expected duration or expected interval of the disturbing pulses, which are induced by the separation of the motor coils from the power supply by the edge change.

11. Circuit according to claim 9, in which the monoflop is built from a monoflop triggered by one edge, in which a time-delayed clock signal is linked via exclusive OR logic with a clock signal that is not time-delayed.

12. Circuit for the commutation of brushless direct-current motors without using sensors, with a circuit according to claim 5.

13. Trigger circuit for control or operation of brushless direct-current motors, with a circuit according to one claim 5.

* * * * *